United States Patent [19]

Mainardi

[11] Patent Number: 5,184,700
[45] Date of Patent: Feb. 9, 1993

[54] LOCKING DEVICE FOR A LINEAR MOVEMENT UNIT

[76] Inventor: Gianfranco Mainardi, Vordere Kirchstrasse 2, CH-9444 Diepoldsau, Switzerland

[21] Appl. No.: 686,140

[22] Filed: Apr. 16, 1991

[30] Foreign Application Priority Data

Apr. 19, 1990 [DE] Fed. Rep. of Germany ....... 4012524

[51] Int. Cl.⁵ .............................................. B23Q 1/28
[52] U.S. Cl. ...................................................... 188/67
[58] Field of Search ..................................... 188/67, 41

[56] References Cited

U.S. PATENT DOCUMENTS

| 2,341,465 | 2/1944 | Monnot | 188/67 |
| 3,817,111 | 5/1974 | Allen | 188/67 |
| 3,951,238 | 4/1976 | Dent et al. | 188/67 |
| 4,007,815 | 2/1977 | Acre | 188/67 |

Primary Examiner—Matthew C. Graham
Attorney, Agent, or Firm—William W. Jones

[57] ABSTRACT

A locking cartridge (20) is supported on the carriage of a linear movement unit, which carriage is movable and positionable on at least one guide rod (8). The locking cartridge (20) contains two clamping members (34r, 34l) of identical construction which are oriented symmetrically to each other with respect to a plane perpendicular to the guide rod and which have head pieces (38r, 38l) seated on the guide rod (8), as well as cam surfaces (501) facing away from said head pieces and serving for spreading the clamping members apart by means of a spreading pin (48), so that the head pieces are clamped to the guide rod (8). The spreading pin (48) is held by an annular sleeve (46) surrounding the clamping members and acted upon by a pressure member (54) against the bias of a coil spring (44). The pressure member is located at the bottom of a cylindrical casing into which a fluid line opens.

9 Claims, 1 Drawing Sheet

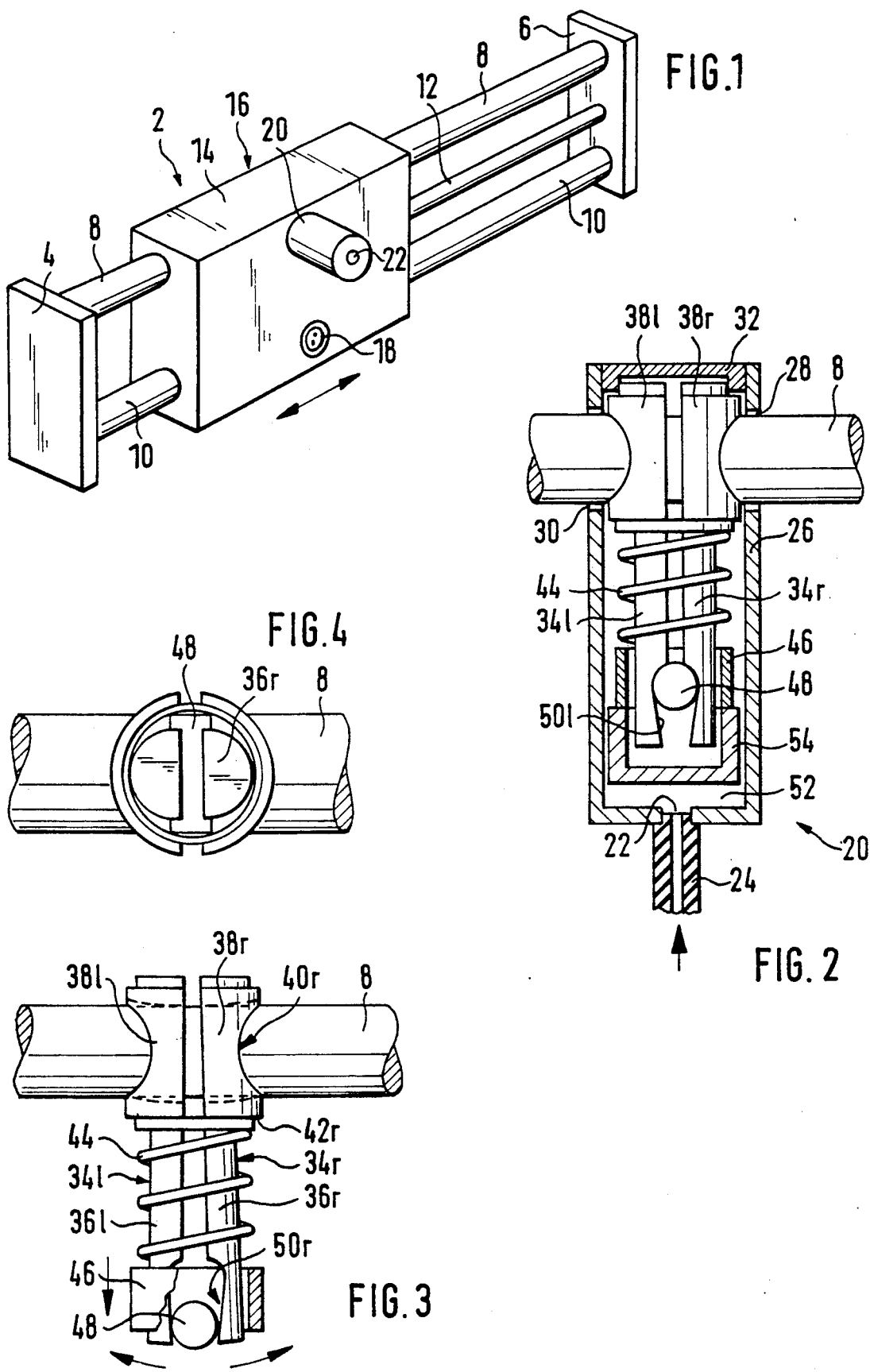

LOCKING DEVICE FOR A LINEAR MOVEMENT UNIT

The invention relates to a locking device for a linear movement unit including a carriage which is movable along at least one guide rod by means of a drive and in which the locking device is supported.

In the field of handling technology, but also in other technical fields, so-called linear movement units or linear guides are employed consisting in general of a guide rod arrangement and a carriage movable thereon. Drive of the carriage is effected hydraulically or pneumatically, preferably with the aid of a piston and cylinder assembly. However, the drive can also be effected with the aid of a linear motor. The guide rod arrangement in the simplest case comprises one single guide rod of circular cross-section, but in most cases at least two guide rods are provided so that the carriage is guided in stabler manner.

There are many fields of application requiring exact and safe locking of the carriage in one specific position. For example, in an industrial robot a position command is fed to a linear movement unit, on the basis of which the carriage is moved to one specific position along the guide rod. Upon reaching the position, the carriage must be locked so that forces acting from the outside cannot change the position of the carriage.

In locking the carriage of a linear movement unit, it is particularly important that there is not only a considerable force produced against a possible positional change of the carriage, but the locking operation itself must not change the once reached position of the carriage.

So far it had been usual to effect locking of a carriage in a linear movement unit with the aid of an eccentric cam acting e.g. on the piston rod of a piston and cylinder unit used for driving the carriage. During the clamping operation the abutment area of the eccentric cam moves approximately parallel to the longitudinal axis of the piston rod at the surface thereof. This results in a displacement of the position of the carriage. It is conceivable to have the eccentric act on a pin slidable transversely of the guide rod. However, in this case, the construction becomes complex due to the counter-bearing necessary then.

It is the object of the invention to develop a locking device of the type indicated at the outset in such a manner that locking of the carriage is rendered possible with a spacesaving construction, without the position of the carriage being changed thereby.

According to the invention, this object is met by two clamping members having the guide rod extending therethrough and being adjustable in opposite directions so as to frictionally engage the guide rod in a first position for locking the carriage and so as to be loosely slidable on the guide rod in a second position.

The effect achieved by the adjustment of the clamping members in opposite directions is that the position of the carriage does not change during the locking operation. The clamping members are either moved away from each other or towards each other. In any case, possible forces directed approx. parallel to the guide rod cancel each other out. The movement is a pivotal motion in clockwise direction and counterclockwise direction, respectively. In the second position, the clamping members are seated loosely on the guide rod. Due to the fact that precision components are utilized, the corresponding seat area of each clamping member need only be slightly larger than the outside contour of the guide rod. In this manner, a slight movement of the clamping members is sufficient in order to change from the first position to the second position and vice versa.

For obtaining with simple means that possible forces, which could entail an alteration of the position of the carriage, cancel each other out, the structure of the clamping members is preferably symmetrical. The invention specifically provides that the clamping members are constituted by two parts which are symmetrical to each other with respect to a plane oriented perpendicularly to the longitudinal axis of the guide rod, each of said parts comprising:
- a head piece having a through-opening adapted to receive the guide rod therein with clearance,
- a shank adjoining the head piece, and
- a cam surface formed in a side facing the respective other part, and that a spreading member is located between the facing cam surfaces and is movable along said cam surfaces by an actuating means in order to pivot the clamping members to the first or the second position. The cam surfaces and the spreading member are preferably located at the ends of the shanks facing away from the head pieces. This creates a considerable leverage so that, with a given spreading force in the region of the cam surfaces, a considerable clamping force is achieved in the head pieces. This clamping force does not cause any damage or deformation of the guide rod, since the guide rod is generally a surface-hardened component part.

The symmetrical construction of the clamping members does not only render possible a relatively simple production thereof, but also provides an absolute uniformness of the clamping forces and, thus, in a particularly favorable manner reaches the object that the carriage, after positioning thereof, is not shifted in any way during the locking operation.

A specific development of the invention provides that the guide rod has a circular cross-section, that each throughopening, provided in the form of a bore, has a somewhat larger circular cross-section in comparison therewith, and that the actuating means is an annular sleeve which is adapted to be acted upon by an energy source and in which a spreading pin abutting the conical cam surfaces is diametrically mounted as spreading member, and which is biased by a coil spring surrounding both shanks and supported on the head pieces. Such a construction of the locking device is space-saving and permits simple adjustment of the clamping members so that these assume their first position or their second position, respectively. The cam surfaces are conical and are moved away from each other or towards each other by the displacement of the spreading pin in the longitudinal direction of the shanks of the clamping members.

The locking device according to the invention can basically be configured as a self-locking or self-releasing component part. A specific embodiment of the invention provides that the conical cam surfaces extend towards each other in the direction towards the ends of the shanks facing away from the head pieces, so that the force of the coil spring biases the clamping members to the first position. This corresponds to the self-locking variant of the locking device. For releasing or unlocking the locking device, the coil spring must be compressed via the clamping sleeve, so that the locking pin reaches a position in which the clamping members can move with their cam surfaces towards each other and are thereby able to release the locking device.

A particular advantage of the locking device according to the invention resides in the possibility of accommodating the entire locking device in a compact casing and of conveniently mounting the locking device, which thus is provided in the form of a cartridge, in the carriage.

To this end, the invention provides first that the locking device provided in the form of a locking cartridge comprises a cylindrical casing having openings for the guide rod extending transversely through the casing, and a connecting opening for an actuating energy source.

Fundamentally possible energy sources for actuating the locking device are a source of pressurized air, a source of hydraulic energy, or electrical energy. The latter serves for actuating the locking device with the aid of an electromechanical arrangement. However, actuation of the locking device preferably is effected pneumatically or hydraulically.

The invention specifically provides for this purpose that, for providing the locking device in the form of a locking cartridge, the clamping members which are each of semicircular cross-section are received in a cylindrical casing in such a manner that their through-openings are aligned with openings in the cylindrical surface of the cylindrical casing, and that the annular sleeve has a pressure member abutting on its face side, which is slidably supported in the bottom portion of the cylindrical casing and together with the casing constitutes a pressure chamber into which a connecting opening for a fluid line opens.

With this configuration, a cylindrical cartridge has been provided that can be mounted with effortless ease. The cartridge mounted in the carriage can be connected to a fluid line, e.g. to a line for pressurized air. After positioning of the carriage in the desired position, the pressure chamber is relieved so that the preferably cup-shaped pressure member releases the annular sleeve. This releases the coil spring, and the two clamping members can assume their first position in which they are frictionally engaged with the guide rod. When the carriage is to be moved to a different location, the pressure chamber is pressurized via the pressurized-air line, so that the pressure member acts on the lower edge of the annular sleeve and thus compresses the coil spring. The clamping members then can assume their second position so that the carriage is released.

An embodiment of the invention will be elucidated in more detail hereinafter with reference to the drawings in which FIG. 1 shows a perspective schematic view of a linear movement unit comprising a locking device according to the invention, FIG. 2 shows a longitudinal sectional view through a locking device in the form of a locking cartridge, in which the carriage partly surrounding the cartridge is not shown for simplification of the view, FIG. 3 shows a view similar to that of FIG. 2, but without the casing surrounding the locking device proper, in which, in contrast to the loose position according to FIG. 2, the locking device is frictionally connected to a guide rod, and FIG. 4 shows a bottom view of the arrangement depicted in FIG. 3.

A locking device according to the invention will be described in the following in conjunction with a specific linear movement unit. Such linear movement units are known per se and shall be elucidated herein with their essential elements only:

According to FIG. 1 a linear movement unit 2 comprises two end pieces 4 and 6 between which extend two mutually parallel guide rods 8 and 10 which are each of circular cross-section. Both guide rods 8 and 10 are surface-hardened.

A piston rod 12 of a piston and cylinder unit, which is not shown in more detail herein, extends between the end piece 6 and a carriage housing 14 of a carriage 16, and through this piston rod 12 the carriage 16 is linearly shifted along the guide rods 8 and 10 in order to be stopped in a specific position. Control of the carriage 16 may be effected e.g. electrically, the carriage 16 being provided with a connecting socket 18 for this purpose. In order to unmovably lock the carriage 16 positioned at a specific location, such that it does not move even under the influence of external forces, a locking device provided in the form of a locking cartridge 20 is integrated in the carriage housing 14. FIG. 1 shows an end portion of the locking cartridge 20 laterally projecting out of the carriage housing 14. The bottom of the locking cartridge 20 is provided with a connecting opening for a fluid line.

FIG. 2 shows in a longitudinal sectional view the construction of the locking cartridge 20 in conjunction with the guide rod 8.

The connecting opening 22 formed in the bottom of a cylindrical casing 26 consisting of aluminum is connected to an air hose 24 through which pressurized air can be introduced into a pressure chamber formed in casing 26, when necessary.

Two openings 28 and 30 are formed at diametrically opposed locations in the cylindrical surface of casing 26. The top of casing 26 is closed by a cover 32 consisting of aluminum.

In the following, reference will be made to FIGS. 2, 3 and 4. FIG. 3 shows the locking cartridge of FIG. 2 without casing and in a clamped position, whereas FIG. 2 shows a loose position of the locking cartridge.

The locking device contains two clamping members 34r, 34l which are symmetrical with respect to a plane perpendicular to the longitudinal axis of the guide rod 8 and which each have a semi-circular, stepped cross-section. The clamping members consist of brass. The addition of "r" and "1", respectively, to the separate parts is to point out that these parts each have a symmetrical counterpart. Thus, it is clear that the addition of "r" or "1", respectively, to a reference numeral indicates that there is always a symmetrical further part.

The clamping members 34r and 34l of identical construction each have a head piece 38r and 38l, respectively, and a shank 36r and 36l, respectively, formed integrally therewith. In the head piece there is a through-bore 40r having an internal diameter slightly larger than the circular outside diameter of guide rod 8. On the inside of the shank 36r, i.e. facing the other shank 36l, the end facing away from head piece 38 is formed with a conical cam surface 50r. This end of shanks 36r, 36l is surrounded by an annular sleeve 46 in which a spreading pin 48 is firmly seated. A coil spring 44 biasing the annular sleeve 46 towards the free end of the shanks is supported on a shoulder 42r of head piece 38r and on a corresponding shoulder of clamping member 34l. The spreading pin 48, via the cam surfaces 50r, 50l extending conically towards each other in the direction towards the outside, spreads the clamping members 34r, 34l away from each other. This spreading apart corresponds to a pivoting motion of the two clamping members in counterclockwise direction (34r) and clockwise direction (34l), respectively, the fulcrum being located in the region of the head pieces 38r and 38l, respectively. The two head pieces are thereby clamped to the guide rod 8. Possible forces in the longitudinal direction of the guide rod thus cancel each other out, so that the position of the locking device with respect to the guide rod 8 does not change.

For releasing the locking device, the spreading pin 48 must be moved upwardly from the position shown in FIG. 3, so that it takes the position shown in FIG. 2. To this end the annular sleeve, which constitutes a movement unit with the spreading pin 48, is moved towards head pieces 38r, 38l by compression of the coil spring 44. The upper face side of a cup-shaped pressure member 54 abuts the lower face side of the annular sleeve 46. The outer bottom surface of the pressure member 54 constitutes, together with the inner portion of cylindrical casing 26, a pressure chamber 52. When pressurized air is introduced into pressure chamber 52, pressure member 54 is moved upwardly and presses annular sleeve 46 upwardly against the spring force of spring 44, so that the spreading pin 48 entrained by sleeve 46 takes the position shown in FIG. 2. The two clamping members 34r, 34l are now seated loosely on guide rod 8, so that the carriage 16 with the locking cartridge can be moved.

Instead of the single locking cartridge 20 shown in FIG. 1, it is also possible to provide two locking cartridges acting on both guide rods 8 and 10.

As can be seen from FIGS. 2 and 3, the locking cartridge 20 is a self-locking member. This means: when no pressurized air is introduced into pressure chamber 52, the locking device takes the position according to FIG. 3, so that it locks the carriage.

If the conical cam surfaces 50r and 50l were formed such that they extend away from each other in the direction towards the outer end of the clamping members (means would have to be provided then holding the spreading pin between the clamping members) the pressing force of coil spring 44 would load the clamping members in a position in which they are loosely seated on guide part 8. Only upon application of pressure to pressure chamber 52 would the coil spring be compressed, and the spreading pin 48 would then spread the clamping members apart for locking the carriage.

I claim:

1. A locking device for a linear movement unit which includes a carriage movable along at least one guide rod by means of a drive, and on which carriage said locking device is supported, said locking device including clamping members having said guide rod extending therethrough, said clamping members being adjustable in one direction to a first position so as to frictionally engage said guide rod to lock said carriage against movement on said guide rod, and said clamping members being adjustable in a direction opposite to said one direction to a second position wherein said carriage is loosely slidable on said guide rod; an automated actuator slidably mounted on said clamping members for reciprocal rectilinear movement on a path of travel which is perpendicular to the direction of movement of said carriage, said clamping members being operable, when said actuator is at one end of said path of travel, to set in said first position, and said clamping members being operable, when said actuator is at an opposite end of said path of travel, to set in said second position; and means for selectively moving said actuator between said ends of said path of travel said clamping members comprising two identical mirror image components combining to form a symmetrical clamp assembly, each of said components including: a first end part having a through bore for receiving said guide rod and an elongated shank adjoining said first end part; and said actuator comprising a sleeve slidably mounted over an end of said shank remote from said first end part; and a spreader interposed between said mirror image components for selectively pivoting said components to a guide rd-clamping position when said sleeve is moved over said shank to one of said ends of said path of travel.

2. The locking device of claim 1 wherein said guide rod is circular in cross section, and said through bores have a larger diameter than said guide rod.

3. The locking device of claim 1 wherein said spreader is a pin positioned diametrically across said sleeve; and further comprising cam surfaces on said mirror image components which cam surfaces face each other on either side of said pin.

4. The locking device of claim 3 wherein said cam surfaces are positioned on sad components on ends thereof most distal of said first end parts to achieve a maximum clamping leverage advantage.

5. The locking device of claim 1 wherein said means for selectively moving comprises spring means mounted on said shanks and operable to bias said sleeve toward a first one of said ends of said path of travel.

6. The locking device of claim 5 wherein said means for selectively moving further comprises fluid pressure means for intermittently urging said sleeve toward a second one of said ends of said path of travel against the bias of said spring means.

7. The locking device of claim 5 further including a cylindrical housing containing said clamping member components, said sleeve, and said spring means; said housing being mounted on said carriage; and wherein said fluid pressure means includes a fluid pressure chamber positioned in one end of said housing.

8. The locking device of claim 5 further comprising a cup-shaped member positioned in said housing adjacent to said one end thereof, said cup-shaped member engaging an end of said sleeve distal of said spring means, and said cup-shaped member forming a movable end wall of said fluid pressure chamber.

9. The locking device of claim 7 further comprising means for selectively admitting a pressurized fluid into said fluid pressure chamber.

* * * * *